(12) United States Patent
Schmidt et al.

(10) Patent No.: US 9,140,379 B2
(45) Date of Patent: Sep. 22, 2015

(54) DEVICE FOR ACTUATING A CONTROL VALVE

(75) Inventors: Andreas Schmidt, Schwarzbach (DE); Toni Steiner, Bachfeld (DE)

(73) Assignee: NIDEC GPM GmbH, Auengrund OT Merbelsrod (DE)

( * ) Notice: Subject to any disclaimer, the term of this patent is extended or adjusted under 35 U.S.C. 154(b) by 266 days.

(21) Appl. No.: 13/978,910

(22) PCT Filed: Jan. 7, 2012

(86) PCT No.: PCT/DE2012/000010
§ 371 (c)(1),
(2), (4) Date: Jul. 19, 2013

(87) PCT Pub. No.: WO2012/095100
PCT Pub. Date: Jul. 19, 2012

(65) Prior Publication Data
US 2013/0306892 A1    Nov. 21, 2013

(30) Foreign Application Priority Data
Jan. 11, 2011  (DE) .......................... 10 2011 008 305

(51) Int. Cl.
*F16K 31/528* (2006.01)
*F16K 1/20* (2006.01)
*F16K 31/04* (2006.01)

(52) U.S. Cl.
CPC ............. *F16K 31/528* (2013.01); *F16K 1/2007* (2013.01); *F16K 31/043* (2013.01); *F16K 31/047* (2013.01); *F16K 31/5282* (2013.01)

(58) Field of Classification Search
CPC . F16K 31/528; F16K 31/5282; F16K 1/2007; F16K 31/043; F16K 31/047; F16K 31/5284
USPC .......... 251/279, 315.01, 315.06, 315.07, 231; 251/58; 137/625.44, 625.45, 625.46, 137/625.47
See application file for complete search history.

(56) References Cited

U.S. PATENT DOCUMENTS 2,019,502 A * 11/1935 Osgood .......................... 222/504
2,647,659 A *  8/1953 Berck .............................. 222/14
(Continued)

FOREIGN PATENT DOCUMENTS

DE   197 29 648 A1   1/1999
DE   198 09 123 B4   9/1999
(Continued)

OTHER PUBLICATIONS

International Search Report of PCT/DE2012/000010, mailed Jul. 17, 2012.

*Primary Examiner* — John K Fristoe, Jr.
*Assistant Examiner* — Andrew J Rost
(74) *Attorney, Agent, or Firm* — Collard & Roe, P.C.

(57) ABSTRACT

An apparatus for activation of a control valve is configurable as a slide, ball valve, rotary slide, poppet valve, or the like, and controls or regulates pressure-impacted media, for example, regulating the coolant volume stream of an internal combustion engine. A push piston linearly displaceable in a piston guide rigidly disposed on the flow housing, with an activation joint, is fastened onto the push housing. A connecting rod is disposed in the activation joint. A push joint is disposed at the push piston end that lies opposite the activation joint, in which push joint the activation element of a control valve is displaceably and/or rotatably disposed. A reset spring is disposed adjacent to the push joint and acts on the push piston, in the direction of its longitudinal axis, so that the push piston always lies against the connecting rod without play, with the activation joint.

9 Claims, 6 Drawing Sheets

(56) References Cited

U.S. PATENT DOCUMENTS

| | | | |
|---|---|---|---|
| 2,701,102 A | | 2/1955 | Albrecht |
| 4,190,074 A | * | 2/1980 | Mailliet et al. ............ 137/315.16 |
| 5,078,180 A | * | 1/1992 | Collins ........................ 137/899 |
| 6,199,822 B1 | * | 3/2001 | Hakansson .................... 251/58 |
| 6,257,177 B1 | | 7/2001 | Lehmann |
| 6,338,330 B1 | | 1/2002 | Jessberger et al. |
| 6,920,846 B2 | | 7/2005 | Pawellek et al. |
| 8,091,858 B2 | * | 1/2012 | Janich et al. .................... 251/58 |
| 8,327,635 B2 | | 12/2012 | Hahnl |

FOREIGN PATENT DOCUMENTS

| | | |
|---|---|---|
| DE | 102 07 653 C1 | 9/2003 |
| DE | 10 2008 048 893 A1 | 4/2010 |
| DE | 10 2009 012 923 B3 | 7/2010 |
| EP | 1 860 298 A2 | 11/2007 |
| GB | 1 262 605 A | 2/1972 |
| WO | WO 03/042514 A1 | 5/2003 |
| WO | WO 2008/046563 A1 | 4/2008 |

* cited by examiner

DEVICE FOR ACTUATING A CONTROL VALVE

CROSS REFERENCE TO RELATED APPLICATIONS

This application is the National Stage of PCT/DE2012/000010 filed on Jan. 7, 2012, which claims priority under 35 U.S.C. §119 of German Application No. 10 2011 008 305.7 filed on Jan. 11, 2011, the disclosures of which are incorporated by reference. The international application under PCT article 21(2) was not published in English.

The invention relates to an apparatus for activation of a control valve, which can be configured as a slide, ball valve, rotary slide, poppet valve, or the like, and which serves for control or regulation of pressure-impacted media, such as, for example, regulation of the coolant volume stream of an internal combustion engine.

In the state of the art, different types of apparatuses for activation of control valves have been previously described.

Thus, among other things, the applicant already presented an electrically driven coolant pump that has been proven in practice, having an axial impeller and a control valve activated by an electric motor, in DE 102 07 653 C1.

In this design, the control valve is disposed ahead of the coolant pump driven by an electric motor, in the flow direction.

The electric motor drives the pump impeller of the pump in a direction of rotation, and the valve, which is configured as a rotary slide, in the opposite direction of rotation, by way of the pump shaft and a freewheel.

In this connection, the use of an electric motor in the coolant volume stream necessarily requires water-tight encapsulation of the electric motor, and increased production costs necessarily result from this.

As a result of the electrical or electronic components used, upper limit values of the temperature stress must always be adhered to, in order to avoid failure of these components as the result of overheating.

A significant disadvantage of this coolant pump driven by an electric motor, with integrated regulation, consists in that after a "power failure," no "fail-safe," i.e. continued function of the module, preventing consequential damage even if the regulation has failed, can be guaranteed.

In DE 10 2009 012 923 B3 , the applicant furthermore previously described another apparatus for adjustment of a control valve configured as a slide, which apparatus has also already proven itself in practice and is activated by means of partial vacuum regulation, in connection with a coolant pump driven mechanically and equipped with an axial impeller.

In this design, the control valve is disposed behind the coolant pump in the flow direction.

This placement of the control valve requires a relatively long axial structure in the aforementioned solution, and furthermore results in high required activation forces because of the direct force introduction that brings about activation of the axial control slide.

Furthermore, a coolant conveying unit is known from DE 10 2008 048 893 A1 , in which an additional coolant exit is disposed between the coolant pump, which once again is provided with an axial impeller, and the control valve, which is disposed behind the coolant pump in the flow direction, for example a ball valve or a rotary slide.

In this solution, the apparatus, which is required for infinitely adjustable activation of the control valve, engages on a square profile disposed in the axis of rotation of the control valve.

"Fail-safe" operation, i.e. automatic complete opening of the valve to be regulated in the event of failure of the regulation, cannot be implemented by means of this solution, either, so that if the regulation fails when the valve is closed, overheating or destruction of the motor vehicle engine will necessarily occur.

Furthermore, the direct force engagement in the axis of rotation of the control valve that is provided in this design necessarily results in low control quality because of the high internal friction of the arrangement disclosed in DE 10 2008 048 893 A1,and this by no means guarantees sensitive, smooth regulation.

Furthermore, another water pump for the cooling circuit of an internal combustion engine, having a control valve integrated into the pump housing and configured as a rotary slide is known from DE 198 09 123 B4.

To adjust this rotary slide, in DE 198 09 123 B4 either a control motor, a wax cartridge or a bimetal strip is used.

This design also has the disadvantage, when using a control motor, that "fail-safe" operation can by no means be implemented, whereby the use of a control motor is furthermore very cost-intensive and by no means guarantees sensitive, smooth regulation with high regulation quality (i.e. point-precise valve adjustment that is precisely reproducible in terms of path and force).

When using a bimetal strip or a wax cartridge, active, demand-dependent regulation is by no means possible.

The wax in the wax cartridge or the bimetal strip has liquefied or deformed after the optimal coolant temperature has been reached (for example approximately 80° C. to 90° C. in motor vehicles), to such an extent that the "physical changes" in the wax cartridge or on the bimetal strip, which have been achieved and are dependent on the coolant temperature, are only "brought back into the original state" again after the engine has cooled down, and this results in very sluggish regulation in the case of such systems.

In the state of the art, other apparatuses for activation of control valves, such as, for example, the apparatus disclosed in WO 2008/046563 A1 for activation of a valve flap, have been previously described.

In this solution, control of a valve flap that is rotatably mounted by means of a shaft takes place by way of a disk/roller disposed on the shaft, on the outer edge of which the one end of a Bowden cable engages, whereby the other end of the Bowden cable is fastened onto a lever, the axis of rotation of which is driven by an electrically driven motor.

Because this apparatus is also equipped with an electric motor, this solution again also demonstrates all the disadvantages of an electrical drive, such as increased production costs, upper limit value of the temperature stress, but also tendency to breakdown in the event of vibration stresses, and more.

In this connection, only very low regulation quality can be achieved with the activation apparatus proposed in WO 2008/046563 A1 , because of the design-related high friction losses, with high required adjustment forces and high stresses on all the modules that bring about activation of the valve flap.

Furthermore, the apparatus proposed in WO 2008/046563 A1 is very susceptible to contamination in its entirety, and, at the same time, requires a relatively large construction space.

A further apparatus for adjusting a valve flap in an intake system of an internal combustion engine is known from DE 197 29 648 A1.

In this arrangement, a longitudinal movement is performed by a membrane device biased by a reset spring, as a function of a partial vacuum applied to the membrane device, which movement is transferred to a cross member by way of a coupling rod mounted on one side, with path translation, whereby the end of the cross member that lies opposite the coupling rod is connected, in articulated manner, with a lever disposed on a rotatably mounted valve flap, in such a manner that the longitudinal movement brought about by the displacement of the membrane device brings about a rotation of the valve flap by 90° as a result of the proposed arrangement.

This apparatus for adjusting a valve flap is an apparatus that requires rather great adjustment forces because of its design structure, and that accordingly puts great stress on the individual components. Because of the design structure, this apparatus does not permit any regulation, but rather merely brings about adjustment of the valve flap from a completely open position to a completely closed position.

In contrast, the invention is based on the task of developing an apparatus for activation of a control valve, which can be configured as a slide, ball valve, rotary slide, poppet valve, or the like, and which serves for regulation of pressure-impacted media, such as, for example, regulation of the coolant volume stream of an internal combustion engine, which apparatus avoids the aforementioned disadvantages of the state of the art and which, at low mechanical stress on the modules that bring about activation of the control valve, allows very sensitive, smooth regulation at high regulation quality, i.e. point-precise valve adjustment that is precisely reproducible in terms of path and force, with minimal friction losses in combination with very low activation forces, with almost the same regulation quality during opening and closing, and, at the same time, guarantees "fail-safe" operation (i.e. automatic, complete opening of the valve to be regulated in the event of failure of the regulation), and which is furthermore characterized by a very compact, cost-advantageous, and robust design that is simple in terms of production and assembly technology, is not prone to breakdown due to vibration stresses, and furthermore works independent of the temperature of the pressure-impacted medium.

According to the invention, this task is accomplished by means of an apparatus for activation of a control valve 1 in accordance with the characteristics of the independent claim of the invention, which can be configured as a slide, ball valve, rotary slide, poppet valve, or the like, and which serves for control and/or regulation of pressure-impacted media, such as, for example, regulation of the coolant volume stream of an internal combustion engine.

Advantageous embodiments, details, and characteristics of the invention are evident from the dependent claims and from the following description of the solution according to the invention, in combination with the drawings regarding the solution according to the invention.

In the following, the invention will be explained in greater detail using an exemplary embodiment, in combination with six representations assigned to the exemplary embodiment.

These show.

This apparatus according to the invention, shown in three different working positions in FIGS. 1 to 6, for activation of a control valve 1 having a flow housing 2 and a flow guide housing 3 disposed adjacent to the former, on which two openings 4 are disposed, which serve for flow exit in accordance with the intended flow direction in the flow housing 2 here, whereby the control valve 1 is disposed on the flow housing 2 in this embodiment, in such a manner that the actuator 5, in this exemplary embodiment a partial vacuum cell 34, disposed adjacent to the control valve 1, is able to act on an activation element 6 disposed on the control valve 1, by way of the activation apparatus 7 according to the invention disposed between the activation element 6 and the actuator 5. Whereby the activation apparatus 7 according to the invention is characterized in that on the one hand, the actuator 5, the partial vacuum cell 34 are rigidly fastened onto the flow housing 2, along with, on the other hand, a point of rotation 8 of a double lever 11 provided with a load arm 9 and a force arm 10, about which point this lever is disposed on the flow housing 2 with rotational articulation, and furthermore, a piston guide 12 for a push piston 13 mounted to be linearly displaceable on the flow housing 2 is rigidly disposed on the flow housing 2. According to the invention, a coupling rod 15 is disposed between a load engagement joint 14 disposed on the load arm 9 of the double lever 11 and the actuator 5, so as to pivot, and a connecting rod 18 is disposed between a force engagement joint 16 disposed on the force arm 10 of the double lever 11 and the activation joint 17 of the push piston 13, so as to pivot. It is essential, in this connection, that a push joint 19, in which the activation element 6 of the control valve 1, in the present exemplary embodiment of a ball valve 28, is disposed in displaceable and rotatable manner, is disposed at the end of the push piston 13 that lies opposite the activation joint 17.

It is characteristic, in this connection, that a reset spring 20 disposed adjacent to the push joint 19, which spring is mounted in a spring accommodation 21 disposed on the flow guide housing 3, acts on the push piston 13, according to the invention, in the direction of its longitudinal axis, in such a manner that the push piston 13 always lies against the connecting rod 18 without play, with the activation joint 17, i.e. biased by the reset spring 20.

Figure 1:
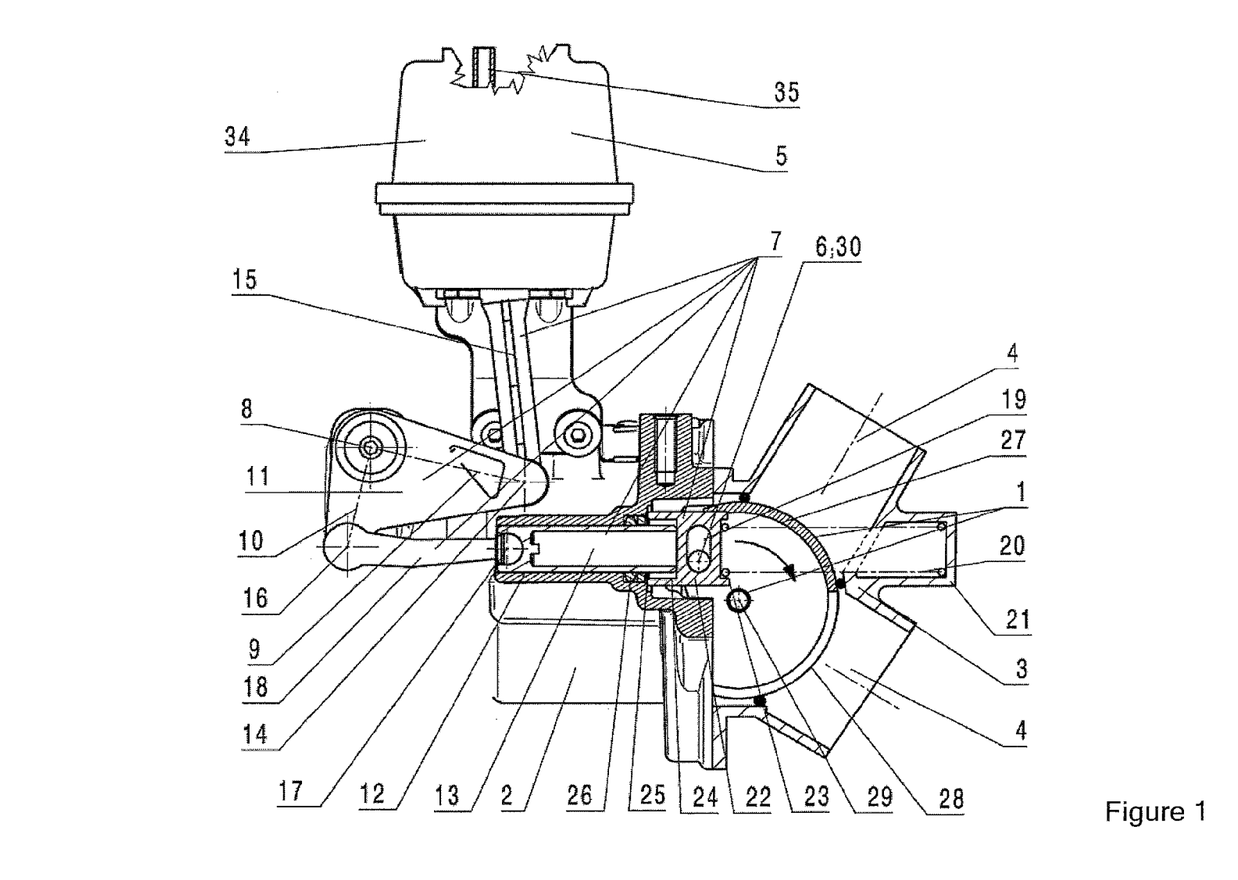
FIG. 1: the apparatus according to the invention, for activation of a control valve 1 having a pneumatically activated partial vacuum cell 34, a ball valve 28, and two openings 4 disposed in the flow guide housing 3 for the flow exit, of which the upper one of the two openings 4 is completely closed by the blocking surface 27 of the ball valve 28 in the "rear" end position of the push piston 13 according to the invention, and, at the same time, the lower one of the two openings 4 is completely opened, in a side view, in partial section.
Figure 2:
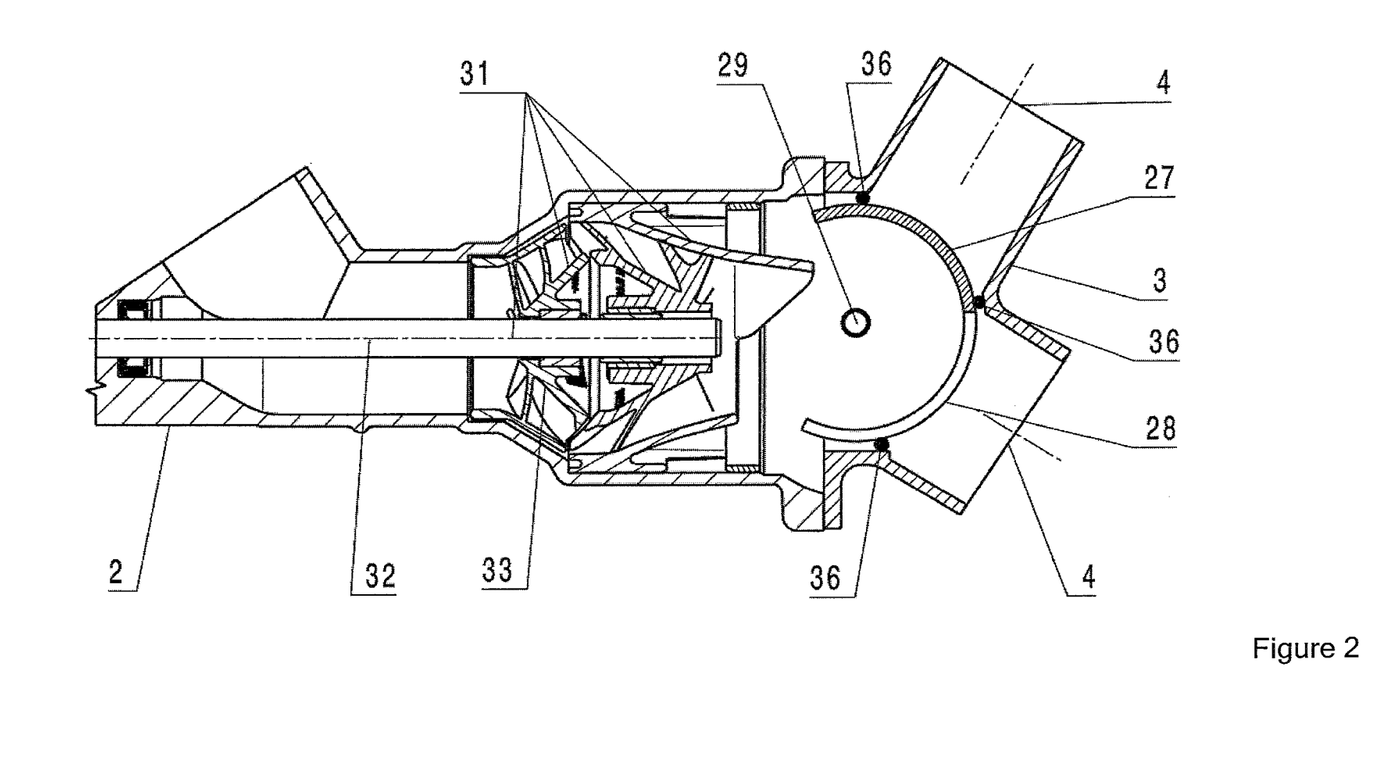
FIG. 2: shows the arrangement according to FIG. 1, with the ball valve 28 in the "upper" end position, in a sectional representation.
Figure 3:
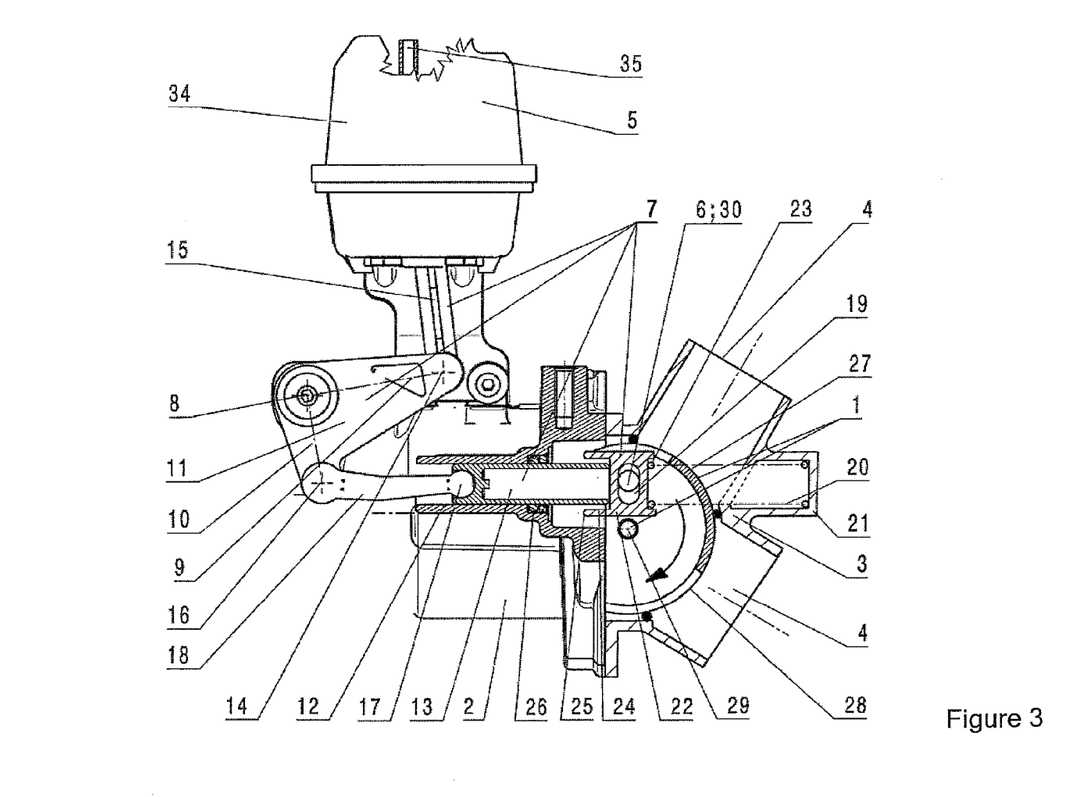
FIG. 3: the apparatus according to the invention, for activation of a control valve 1 having a pneumatically activated partial vacuum cell 34, a ball valve 28, and two openings 4 disposed in the flow guide housing 3 for the flow exit, of which the upper one and, at the same time, the lower one of the two openings 4 are partly closed by the blocking surface 27 of the ball valve 28 in the "center position" of the push piston 13 according to the invention, in a side view, in partial section.
Figure 4:
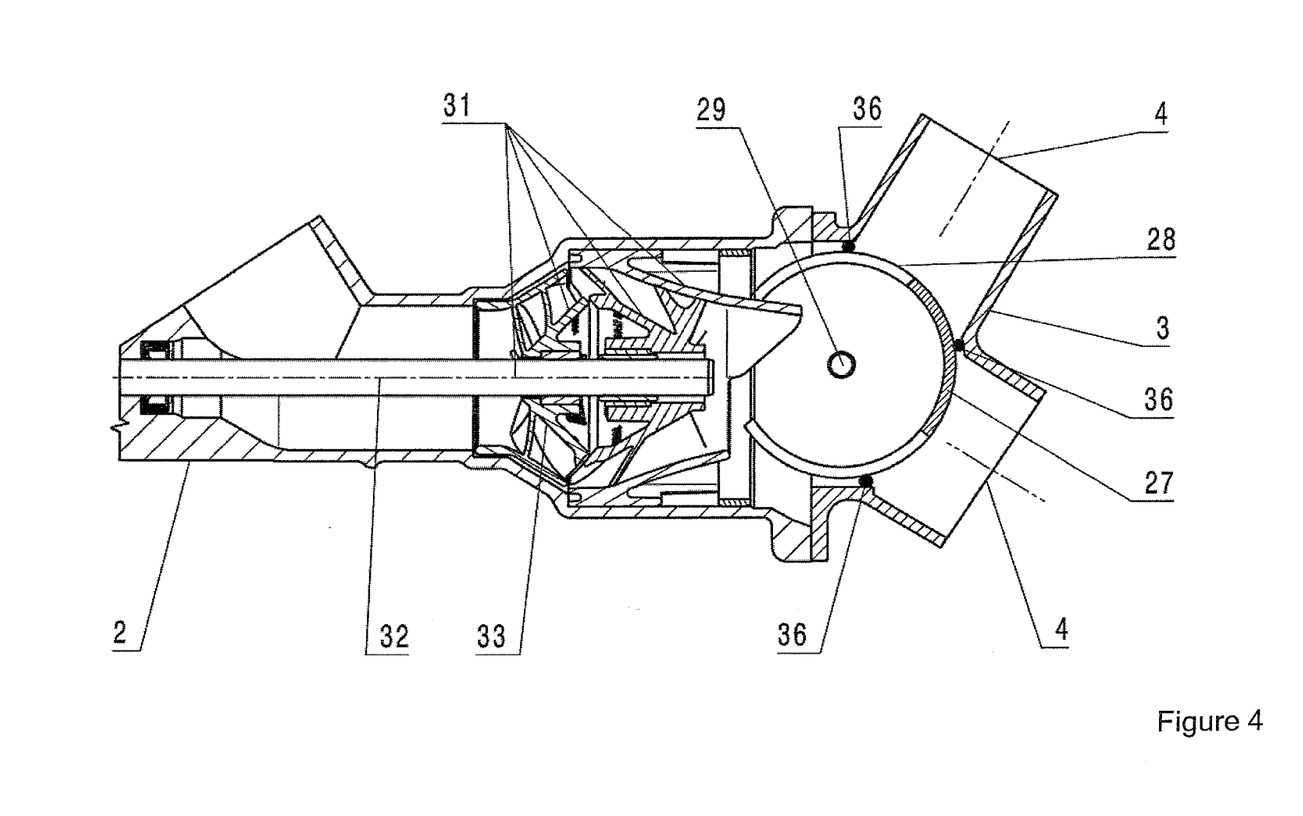
FIG. 4: shows the arrangement according to FIG. 3, with the ball valve 28 in the "center position," in a sectional representation.
Figure 5:
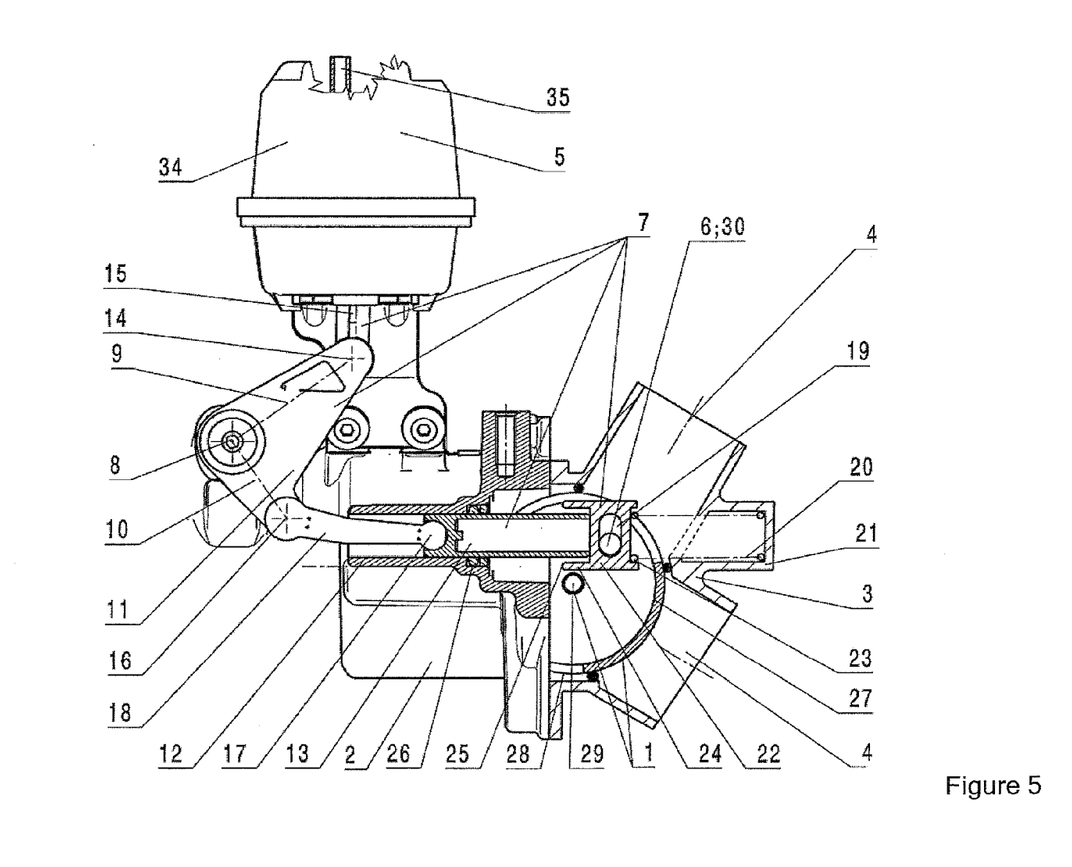
FIG. 5: the apparatus according to the invention, for activation of a control valve 1 having a pneumatically activated partial vacuum cell 34, a ball valve 28, and two openings 4 disposed in the flow guide housing 3 for the flow exit, of which the lower one of the two openings 4 is completely closed by the blocking surface 27 of the ball valve 28 in the "front" end position of the push piston 13 according to the invention, and, at the same time, the upper one of the two openings 4 is completely opened, in a side view, in partial section.
Figure 6:
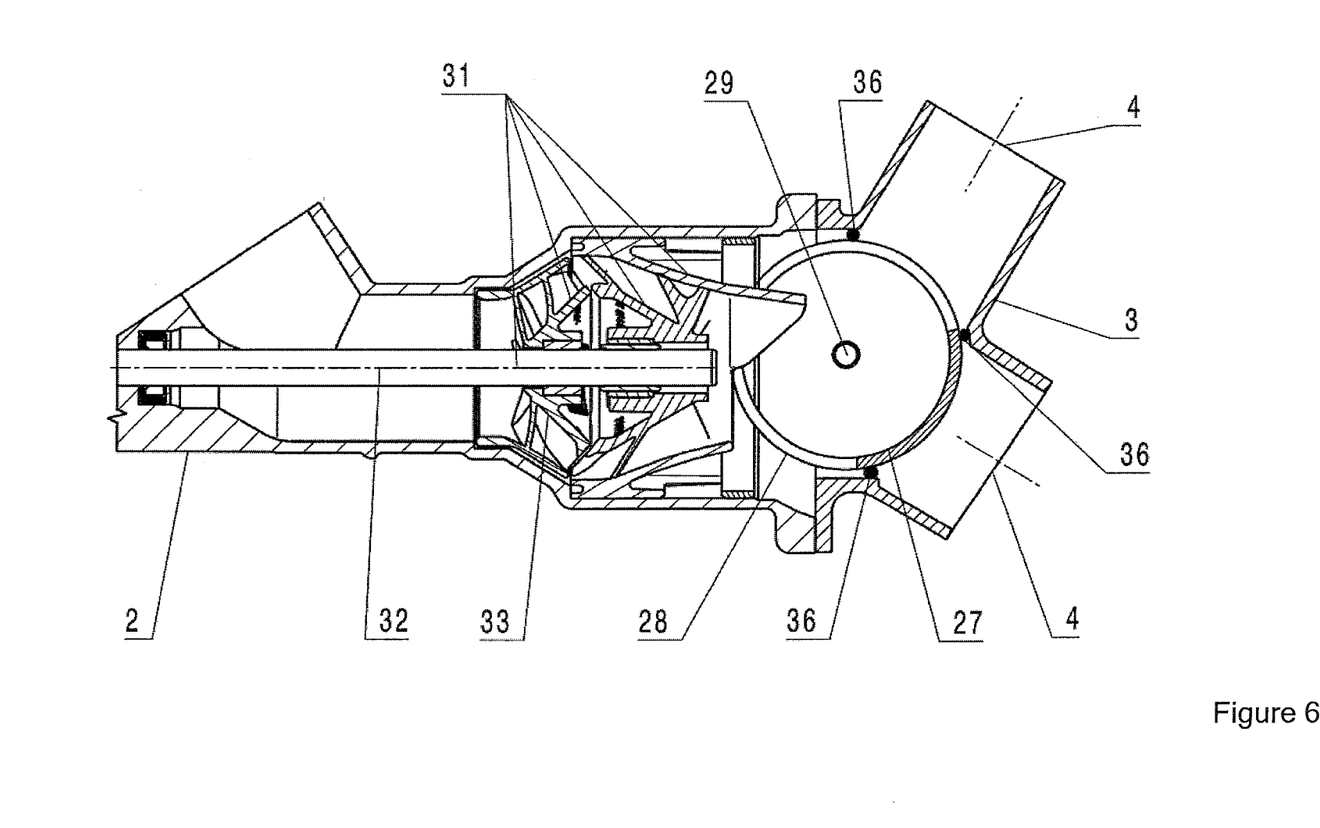
FIG. 6: shows the arrangement according to FIG. 1, with the ball valve 28 in the "lower" end position, in a sectional representation.

This apparatus according to the invention, for activation of a control valve 1, such as, in the present exemplary embodiment, of a ball valve 28, makes regulation of the coolant volume stream of an internal combustion engine possible, as shown in FIGS. 2, 4, and 6, at low mechanical stress on the modules that bring about activation of the control valve, at minimal friction losses in combination with very low activation forces, whereby making it possible to guarantee very sensitive, smooth regulation at high regulation quality, i.e. a point-precise valve adjustment that is precisely reproducible in terms of path and force, with almost the same regulation quality during opening and closing, and, at the same time, "fail-safe" operation (i.e. automatic complete opening of the valve to be regulated, by means of the reset spring 20, in the event of failure of the regulation) is guaranteed, whereby the solution according to the invention is furthermore characterized by a very compact, cost-advantageous, and robust design that is simple in terms of production and assembly technology, is not prone to breakdown due to vibration stresses, and furthermore works independent of the temperature of the pressure-impacted medium.

By means of the arrangement according to the invention, it becomes possible, in combination with the piston that works in "clamped" manner, according to the invention, to repeatedly set simply any possible intermediate position of the control valve 1, in reproducible manner, at any time, and thereby to guarantee play-free regulation, precise to millimeters, i.e. very precise regulation with high regulation quality, in combination with low mechanical stress on the modules that bring about activation of the control valve 1, of the ball valve 28.

In this connection, the arrangement according to the invention, in combination with the minimal friction losses resulting from the arrangement according to the invention, simultaneously brings about the result that sufficiently high adjustment forces can already be generated at very small partial vacuums, which forces allow reliably activating valves of all types.

In connection with the very low activation forces required for setting/adjusting the control valve 1, it becomes possible to control any desired intermediate position of the control valve 1 in very sensitive manner, so that point-precise valve adjustment that is precisely reproducible in terms of path and force can be guaranteed at almost the same regulation quality both when opening and when closing the valve to be regulated.

In connection with the arrangement according to the invention, the reset spring 20 simultaneously allows fast reset, i.e. fast opening of the valve, and, as has already been mentioned, simultaneously guarantees "fail-safe" operation, i.e. it brings about automatic complete opening of the valve to be regulated in case of failure of the regulation.

In this connection, the very compact, cost-advantageous, and robust design that is simple in terms of production and assembly technology is not prone to breakdown due to vibration stresses and contamination, and, because of the spatial arrangement of the modules that interact with one another according to the invention, on the outside of the flow housing, works independent of the temperature of the pressure-impacted medium to be regulated, so that very great permissible maximal temperature stress becomes possible.

It is also essential to the invention, in this connection, that the push joint 19, in a preferred design, is disposed in a push piece 22, i.e. as a separate component, in which a spring centering seat 23 is disposed next to an oblong hole, the push joint 19, that runs perpendicular to the displacement direction of the push piston 13, on a face side, adjacent to the reset spring 20 configured as a pressure spring, and, on the opposite face side, a piston centering collar 24 having a housing contact crosspiece 25 is disposed adjacent to the push piston 13.

In this connection, this advantageous embodiment of the push joint as a separate push piece once again simplifies the production and the assembly of the apparatus according to the invention, and, at the same time, particularly in the case of a plurality of different design sizes, allows a clear reduction in warehousing, by means of a standardization effect that becomes possible by means of the arrangement according to the invention.

It is furthermore characteristic, in this connection, that the load engagement joint 14, the force engagement joint 16, and the activation joint 17 are configured as ball joints. In this way, a high level of operational safety and reliability is guaranteed, even under extreme operating conditions, such as in connection with transmission levels that do not "align" with one another.

A further characteristic of the invention is also that piston seals 26 are disposed on the push-joint-side end of the piston guide 12 of the push piston 13. These seals serve for increasing reliability and particularly reduce the susceptibility to breakdown with regard to extreme contamination, for example also in connection with longer periods of non-use.

However, it is also essential in this connection that, as disclosed in all the representations of the exemplary embodiment, the control valve 1 is configured as a ball valve 28 provided with a blocking surface 27, with a ball valve axis 29 mounted in the flow guide housing 3, and that the flow guide housing 3 is provided with two openings 4 for the flow exit, whereby an eccentric pin 30 is disposed at a distance from the ball valve axis 29 by one radius provided as an activation element 6 on the ball valve 28.

It is also in accordance with the invention, in this connection, that in the region of the two openings 4 for the flow exit, seals 36 are disposed between the flow guide housing 3 and the ball valve 28, in each instance, which seals allow cost-advantageous, optimal sealing of the outflow openings and thereby very operationally safe, reliable, optimal regulation of the coolant volume stream.

It is also characteristic, in this connection, that, as shown in FIGS. 2, 4, and 6, a coolant pump 31 through which flow takes place axially is disposed in the flow housing 2, with a semi-axial impeller 33 disposed on a drive shaft 32.

This design of the apparatus according to the invention, disclosed in the aforementioned representations of the present exemplary embodiment, for activation of a control valve 1 in connection with a coolant pump 31 through which axial flow takes place, and two "regulated" openings 4 for the flow exit, makes it possible, for example, for a main flow channel to be supplied by way of one of the two openings 4, by means of which channel optimal cooling of the cylinder crankcase of the cylinder head is guaranteed.

By way of the second "regulated" opening, a bypass channel can be connected, which simultaneously guarantees optimal cooling of special components, such as, for example, exhaust gas recirculation, the exhaust manifold, the heating system, and more, at "zero-conveying" in the main flow channel.

In other words, by means of the present solution, optimal warming of the engine with "standing cooling water" can be implemented in the cylinder crankcase and in the cylinder head, while the main flow channel is completely shut down/ closed by the control valve 1 according to the invention.

At the same time, the arrangement according to the invention brings about a completely open bypass channel in this working position/end position of the control valve 1, i.e. of the ball valve 28, and thereby optimal cooling of the special components "served" by the bypass channel, such as, for example, exhaust gas recirculation, the exhaust manifold, the heating system, and more.

The solution according to the invention presented in this exemplary embodiment brings about the result that the coolant volume stream flowing out of the flow housing 2 into the flow guide housing 3 can be optimally regulated by means of the solution according to the invention, in simple and cost-advantageous manner, as needed, i.e. can be completely or partially introduced into one, in each instance, or also divided up, in defined manner, into the two openings 4 provided for flow exit, for example a main flow channel and/or a bypass channel, so that by means of the solution according to the invention, the main flow channel can be completely shut down even at a cold start of the engine, so that during a cold start of the engine, a zero conveyed amount is guaranteed in the main flow channel.

At the same time, the arrangement described in the present exemplary embodiment also brings about the result that a coolant volume stream can always exit from the coolant pump 31 shown in FIGS. 2, 4, and 6, on the pressure side, so that the coolant pump 31 never has to work against standing coolant.

This coolant volume stream circulation that is always guaranteed in the present exemplary embodiment brings about a clear reduction in the total drive power of the coolant pump disposed in the exemplary embodiment according to the invention.

It is furthermore also characteristic that, as shown in the exemplary embodiment, the actuator 5 is a partial vacuum cell 34 with a partial vacuum connector 35.

Use of the arrangement according to the invention, in combination with the placement of a partial vacuum cell 34 in the exemplary embodiment presented here, allows active regulation of the coolant circuit of a motor vehicle in all operating states.

Thus, in city traffic, due to the $CO_2$ emissions, higher coolant temperatures are used, which requires very short regulation times; in interstate or highway travel, on the other hand, slightly lower coolant temperatures are used; all these requirements can be implemented without problems, for the first time, in connection with engine management by means of the arrangement according to the invention presented here, at very high regulation quality and simultaneously very low component costs.

The apparatus according to the invention makes it possible for the engine management to precisely set the optimal coolant temperature to be set precisely, by way of precise variation of the regulation times and regulation paths, on the basis of the precisely reproducible activation forces, with precisely reproducible adjustment paths, and an almost constant regulation quality during opening and during closing, in combination with point-precise adjustment of the "valve position," which is precisely reproducible at any time, in accordance with the operating state, in each instance (e.g. city traffic, highway travel, interstate travel).

Reference Symbol Listing
1 control valve
2 flow housing
3 flow guide housing
4 opening
5 actuator
6 activation element
7 activation apparatus
8 point of rotation
9 load arm
10 force arm
11 double lever
12 piston guide
13 push piston
14 load engagement joint
15 coupling rod
16 force engagement joint
17 activation joint
18 connecting rod
19 push joint
20 reset spring
21 spring accommodation
22 push piece
23 spring centering seat
24 piston centering collar
25 housing contact crosspiece
26 piston seal
27 blocking surface
28 ball valve
29 ball valve axis
30 eccentric pin
31 coolant pump
32 drive shaft
33 semi-axial impeller
34 partial vacuum cell
35 partial vacuum connector
36 seal

The invention claimed is:

1. Apparatus for activation of a control valve (1), having a flow housing (2) and a flow guide housing (3) disposed adjacent to the former, on which a/multiple opening(s) (4) is/are disposed, which serve(s), in accordance with the intended flow direction in the flow housing (2), either for flow entry or for flow exit, wherein the control valve (1) is disposed either in the flow housing (2) and/or in the flow guide housing (3), in such a manner that an actuator (5) disposed adjacent to the control valve (1) is able to act on an activation element (6) disposed on the control valve (1), directly or by way of an activation apparatus (7) disposed between the activation element (6) and the actuator (5), a) wherein the actuator (5) is rigidly fastened onto the flow housing (2), a double lever (11) provided with a point of rotation (8), a load arm (9), and a force arm (10), is fastened onto the flow housing (2) with rotational articulation about its point of rotation, and a push piston (13) linearly displaceable in a piston guide (12) rigidly disposed on the flow housing (2) is fastened onto the flow housing (2), and b) wherein a coupling rod (15) is disposed between a load engagement joint (14) disposed on the load arm (9) and the actuator (5), so as to pivot, and a connecting rod (18) is disposed between a force engagement joint (16) disposed on the force arm (10) and the activation joint (17) of the push piston (13), so as to pivot, and c) wherein a push joint (19), in which the activation element (6) of the control valve (1) is disposed in displaceable and/or rotatable manner, is disposed at the end of the push piston (13) that lies opposite the activation joint (17), and d) wherein a reset spring (20) disposed adjacent to the push joint (19), which spring is mounted in a spring accommodation (21) disposed on the flow guide housing (3), acts on the push piston (13), in the direction of its longitudinal axis, in such a manner that the push piston (13) always lies against the connecting rod (18) without play, with the activation joint (17).

2. Apparatus for activation of a control valve (1) according to claim 1, wherein the push joint (19) is disposed in a push piece (22), in which a spring centering seat (23) is disposed next to an oblong hole, the push joint (19), that runs perpendicular to the displacement direction of the push piston (13), on a face side, adjacent to the reset spring (20) configured as a pressure spring, and, on the opposite face side, a piston centering collar (24) having a housing contact crosspiece (25) is disposed adjacent to the push piston (13).

3. Apparatus for activation of a control valve (1) according to claim 1, wherein the load engagement joint (14), the force engagement joint (16), and the activation joint (17) are configured as ball joints.

4. Apparatus for activation of a control valve (1) according to claim 1, wherein piston seals (26) are disposed on the push-joint-side end of the piston guide (12) of the push piston (13).

5. Apparatus for activation of a control valve (1) according to claim 1, wherein the control valve (1) is configured as a ball valve (28) provided with a blocking surface (27), with a ball valve axis (29) mounted in the flow guide housing (3), with two openings (4) for the flow exit, and an eccentric pin (30) disposed at a distance from the ball valve axis (29) by one radius, as an activation element (6).

6. Apparatus for activation of a control valve (1) according to claim 5, wherein seals (36) are provided in the region of the two openings (4) for the flow exit, between the flow guide housing (3) and the ball valve (28), in each instance.

7. Apparatus for activation of a control valve (1) according to claim 1, wherein a coolant pump (31) through which axial flow takes place, having a semi-axial impeller (33) disposed on a drive shaft (32), is disposed in the flow housing (2).

8. Apparatus for activation of a control valve (1) according to claim 1, wherein the actuator (5) can be activated pneumatically, hydraulically, electrically, or also electromechanically.

9. Apparatus for activation of a control valve (1) according to claim 8, wherein the actuator (5) is a partial vacuum cell (34) having a partial vacuum connector (35).

* * * * *